US007818633B2

(12) United States Patent
Little

(10) Patent No.: US 7,818,633 B2
(45) Date of Patent: Oct. 19, 2010

(54) METHOD AND APPARATUS FOR IDENTIFICATION OF PROGRAM CHECK ERRORS INDICATING CODE WITH HIGH POTENTIAL FOR STORAGE OVERLAY

(75) Inventor: Patricia B. Little, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 598 days.

(21) Appl. No.: 11/771,348

(22) Filed: Jun. 29, 2007

(65) Prior Publication Data

US 2009/0006907 A1    Jan. 1, 2009

(51) Int. Cl.
*G06F 11/00* (2006.01)
*G06F 11/34* (2006.01)

(52) U.S. Cl. .................. 714/53; 714/38; 714/39; 714/45; 714/763

(58) Field of Classification Search .......... 714/39, 714/763, 38, 45, 53
See application file for complete search history.

(56) References Cited

U.S. PATENT DOCUMENTS

| | | | | |
|---|---|---|---|---|
| 3,982,231 | A * | 9/1976 | Bernstein et al. ............ | 711/153 |
| 4,677,546 | A * | 6/1987 | Freeman et al. ............. | 711/203 |
| 4,731,740 | A * | 3/1988 | Eguchi ....................... | 711/207 |
| 4,943,913 | A * | 7/1990 | Clark ......................... | 711/206 |
| 5,119,377 | A | 6/1992 | Cobb et al. .................. | 371/19 |
| 5,454,086 | A * | 9/1995 | Alpert et al. ................ | 712/227 |
| 5,586,301 | A * | 12/1996 | Fisherman et al. ......... | 711/152 |
| 5,619,671 | A * | 4/1997 | Bryant et al. ............... | 711/202 |
| 5,666,514 | A * | 9/1997 | Cheriton .................... | 711/144 |
| 6,754,856 | B2 * | 6/2004 | Cofler et al. ................ | 714/53 |
| 6,851,074 | B2 | 2/2005 | Miloiicic et al. ............ | 714/20 |
| 7,103,804 | B2 | 9/2006 | Bang ......................... | 714/38 |
| 2006/0259826 | A1 | 11/2006 | Swoboda et al. ............ | 714/38 |

OTHER PUBLICATIONS

"Software Defects and their Impact on System Availability—A Study of Field Failures in Operating Systems," M. Sullivan, R. Chillarege, Fault Tolerant Computing, 1991, FTCS-21—Digest of Papers, Twenty First International Symposium, pp. 2-9, Jun. 25-27, 1991.
"Program Storage Overlay Detection," IBM Technical Disclosure Bulletin, Mar. 1994, vol. 37, Issue 3, pp. 381-384.

* cited by examiner

*Primary Examiner*—Scott T Baderman
*Assistant Examiner*—Joseph Schell
(74) *Attorney, Agent, or Firm*—William A. Kinnaman, Jr., Esq.; Kevin P. Radigan, Esq.; Heslin Rothenberg Farley & Mesiti P.C.

(57) ABSTRACT

In a data processing system, in order to provide its operating system with a better mechanism to identify and track addressing errors with a high potential to cause a storage overlay, it is first determined whether or not, a program interrupt has occurred. It is next determined whether or not this interrupt involves or occurs as a result of an address translation. It is then determined whether or not, the instruction involved calls for an update of storage. If it is determined that all three of these conditions are satisfied, then a flag is set in an area of storage accessible to the operating system so that it may provide a more specific event monitoring record.

17 Claims, 2 Drawing Sheets

METHOD AND APPARATUS FOR IDENTIFICATION OF PROGRAM CHECK ERRORS INDICATING CODE WITH HIGH POTENTIAL FOR STORAGE OVERLAY

TECHNICAL FIELD

The present invention relates in general to central processor and operating system functions, and more particularly, to providing cooperative interaction which ameliorates the problem of storage overlays in a data processing system. Even more particularly, the present invention is directed to a system and method which identifies interrupt conditions (program checks) which reflect a program with a high potential of causing a storage overlay.

BACKGROUND OF THE INVENTION

Before describing the nature of the problem addressed by the present invention, it is desirable to consider the environment in which it operates. The description of the environment is specifically directed to the IBM zSeries of mainframe data processing systems and the z/OS Operating System, both of which are produced and offered for sale or license by the assignee of the present invention. However, the present invention should not be construed as only being operable in this environment.

Virtually all modern data processing systems include a central processing unit (CPU) coupled to an addressable random access memory (RAM) which is typically, though not exclusively, implementable as a convenient form of volatile storage. The data processing system is also equipped with more permanent storage typically, though again not exclusively, in the form of a rotating magnetic disk memory array, often referred to as DASD (Direct Address Storage Device). Such systems also include a mechanism that provides the well known virtual memory function in which addresses for programs, data and system parameters are permitted to exceed the maximum RAM value in which instance hardware functions take over the task of loading the needed information into an available "page" of the RAM. This operation usually involves "swapping out" an area of RAM (main memory) which may not have recently been used (at least in one swapping algorithm). DASD is included in the description of the present invention because of its use in data processing systems which employ the virtual storage concept, which includes almost all modern data processing systems. The more relevant concept is the virtual storage addressability concept and its resulting address translation operations.

Code attempting to write to the virtual address of a swapped out page does cause the hardware to (1) signal a program check (2) on address translation (3) for a storage update request, but this is a valid and resolvable type of situation as noted above. In these cases, the operating system processes the program check, determines that the page can be brought into storage successfully, and does not record anything.

On the other hand, if code attempts to write to a virtual address that is invalid because it didn't map to valid storage of any kind, this causes the hardware to (1) signal a program check (2) on address translation (3) for a storage update request, but software finds this address to be non-translatable, thus an error condition results. This second case is an instance where code is using an address other than what had been intended, and had gotten caught with a translation failure. Under less fortunate circumstances, had the invalidly used address coincidentally/accidentally mapped to a valid page of storage (paged out or not), this would result in a storage overlay rather than a pre-emptive program check error. The present invention externalizes these "lucky" program checks in the hopes of alerting customers and Level 2 support representatives to the potential for the "less fortunate circumstance" that could occur.

Since data processing systems simultaneously provide services to a plurality of end users, as well as to the operating system itself, there is provided a storage key mechanism which is used to assist in isolating end users to their own storage areas for both read and write access. However, the number of keys is limited to a number which is much smaller than the number of end users. The key field assists in providing a mechanism in which each user accesses their own assigned areas of memory, both real memory and their assigned virtual memory, but by itself, the key field is not a guarantee. In the zSeries of data processing system, for example, this protection mechanism is provided via a KEY field in the Program Status Word (PSW), an architected internal hardware register that is primarily used to control instruction sequencing, but which possesses a number of ancillary fields. The field therein that is relevant to the present invention is this KEY field. With each address in memory there is an associated key value. In a typical system, there are often hundreds of users, but only sixteen keys. Any authorized program has the ability to run in key0 (binary "0000") and to corrupt storage associated with key0. As far as the rules for read and write access are concerned, generally a program of any PSW KEY field can read storage of any key, the exception being when the storage area has an attribute that is called fetch-protected. However, in order for a program to update storage, its PSW key must match the storage key it is updating OR its PSW KEY field is 0. The most significant system control blocks are found in key0 storage. Any program running key0 can update these blocks. This is why the identification of errant attempts to update storage by programs running PSW key0 are very interesting to know about. However, errant attempts to update storage by programs running in a PSW KEY field other than 0 are also interesting to know about.

Overlays are a common occurrence in data processing systems including the zSeries of machine which typically runs the z/OS operating system; however, logical partitions of this machine and others of a similar design can run other operating systems either directly or in a non-native mode. It is noted that, in any data processing system any overlay can be damaging, but overlays of storage protected by the "0000" key are especially problematic since they tend to be of higher impact to customers. Identifying the source of an overlay can be difficult, often requiring a combination of skill and luck. Frequently, the source of an overlay cannot be resolved, exposing the customer to the possibility of another occurrence. Trapping such overlays can be extremely difficult, especially if the target of the overlay on a recurrence cannot be predicted.

One method that is sometimes used to diagnose such overlays relies on the premise that, if a piece of code overlaid storage and got away with it, perhaps there are other times that it executes with bad data and does not get away with it, but causes a program check instead. While this method is applied to diagnosis of storage overlays for storage associated with any key, it has typically been used for catching overlays of key0 ("0000") storage, and so is described here in that context; however, it is should be understood that the scope of the present invention is not limited to key0 situations.

Like many operating systems, the z/OS system provides an external record of various events that are meant to provide an insight into improving system resource management. In the z/OS system, this function is provided in the form of an externally available data set that is identified as logrec. Through the reactive use of a provided tool, the customer who has experienced an overlay that could not be diagnosed is provided with a set of user definable traps which are designed to force externalization of all unexpected system key program checks via the logrec data set. The logrec file is then reviewed periodically by Level 2 software support. For purposes of better understanding the purpose, functioning and advantages of the present invention, it should be appreciated that Level 2 support involves the intervention of a highly skilled person who is capable of diagnosing the reasons for overlay problems and their prevention. When diagnosing an overlay of key0 storage, the L2 support expert looks for program check errors, with PSWs in key0, occurring on an instruction that is updating storage.

This method is effective in diagnosing some overlays, but has certain drawbacks. Firstly, this method provides a reactive solution. The method is put in place after the customer experiences an overlay for which the cause could not be identified. The overlaying program may have caused several program checks prior to or immediately after overlaying storage, yet this is quite likely to go undocumented. This means that overlay problems are going undiagnosed because valuable clues are never externalized. Failure to successfully diagnose overlays to important system storage areas often means additional customer outages. Secondly, the Level 2 systems expert's time and expertise are now being employed to manually filter the logrec information. Therefore, a continuing supply of data is being regularly provided to L2 software support experts. The process of providing logrec to the Level 2 expert means that the customer gathers and transmits logrec data on a regular basis. This becomes tiresome for the customer and sometimes leads to a lack of customer follow-through in transmitting the data. This in turn leads to missed opportunities to diagnose important problems.

SUMMARY OF THE INVENTION

One of the purposes of the present invention is to detect and externalize instances of program check errors that are the result of an address translation exception (for example, page fault, segment fault, etc.) while trying to perform a storage update operation. By doing this, the invention identifies errant code with a high potential of overlaying storage. This information can be acted on proactively to actually prevent many storage overlays. Furthermore, externalizing these program check errors provides additional valuable information that can be used when performing diagnosis of an overlay that has already occurred.

To accomplish this, a hardware mechanism is provided to detect and communicate to the operating system all instances where a program interrupt involving translation exception occurs on an attempted storage update. The operating system software then uses this additional information to identify and record program check errors that occur when trying to update storage. These program checks are relevant because they indicate code with a potential to overlay storage. This recorded information is used to document potential circumstances for an overlay of storage associated with any key value; however, the invention is particularly useful for recording program checks in those environments that present the potential for overlaying system-key storage and especially key0 storage. In this regard it is noted that system-key storage is not necessarily storage associated with key0. Such "alert records" are easily identifiable as unique and important and customers can readily recognize the significance of the event and act accordingly. By making the alert record readily identifiable, the customer is able to perform first-pass analysis without requiring L2 level intervention. No time is wasted in transmitting data or hand-reducing the data to program checks occurring on storage updates.

Of particular importance is the fact that the present invention prevents outages in two ways. Firstly, it externalizes all program check errors in code that is performing storage update while running in PSW key0. This provides additional and potentially highly relevant diagnostic information which provides successful diagnosis of many key0 storage overlays that otherwise would have gone unresolved. Future instances of the problem are thus averted. Secondly, the present invention provides a forewarning to the customer of a potentially problematic situation. This allows the customer to take action before a critical storage overlay actually occurs.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION

Figure 1:
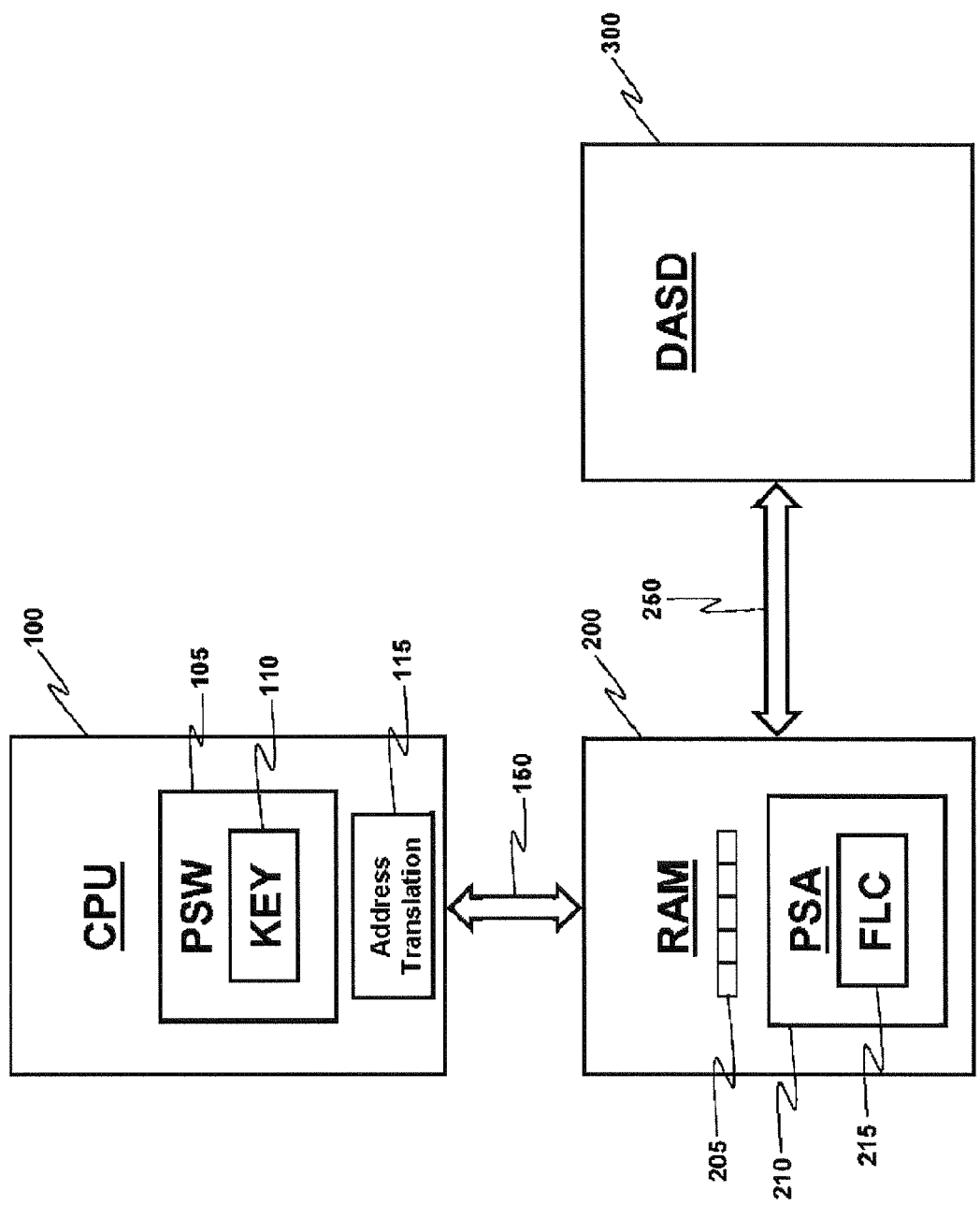
FIG. 1 is a block diagram illustrating the typical environment in which the present invention is employed.

FIG. 1 illustrates the typical environment in which the present invention is employed. The environment comprises three main portions, central processing unit 100, main memory 200 and non-volatile memory 300 (typically a direct address storage device implemented in the form of rotating magnetic disk memory, but not limited thereto). Central processing unit 100 includes a register, which is used to control stored program sequencing and provides security for various regions of allocated memory. In particular, central processing units of zSeries mainframes, include a register referred to as Program Status Word (PSW) 105. PSW 105 also includes key field 110. As described above, this field controls access to the aforementioned allocated storage regions. Central processing unit 100 also includes a mechanism for address translation 115. This mechanism is used to determine the physical location of data referred to by virtual memory addresses. Double arrow 150 is meant to suggest two things: the first is that multiple data bytes flow in both directions between central processing unit 100 and main memory 200; the second is that between central processing unit 100 and main memory 200 there may also be disposed one or more levels of cache memory.

The environment of the present invention also includes main memory 200 and a non-volatile memory 300. As with double arrow 150, double arrow 250 is also meant to suggest two things: firstly that multi-byte wide data flows in both directions; and secondly that one or more levels of cache memory may also be disposed between main memory 200 and DASD 300. Main memory 200, also designated as RAM, standing for Random Access Memory, is typically allocated among a plurality of users by the system's operating system, such as z/OS. This partitioning is suggested by the plurality of memory blocks 205. Main memory 200 also includes Prefixed Save Area (PSA) 210, which itself includes Fixed low Core (FLC) area 215. Main memory area 215 is used as a designated communications area from which the operating system can retrieve information concerning the data collected as a consequence of carrying out the process of the present invention. This process is now more particularly described.

For a page fault, segment fault, or any other program interrupt involving a translation exception address, hardware communicates to software whether the address being translated was being accessed for storage update versus storage reference. This indication is communicated in the Fixed Low Core (FLC) portion of the PSA (Prefixed Save Area). This is an area of storage that is allocated for use by the operating system which has many uses one of which is communicating status and event information to the operating system. Each processor in a data processing system has its own PSA in main memory. For convenience it is typically assigned a starting address of zero and includes two "pages" of memory (with the size of a page being determined by the system's virtual memory structure). However, it is noted that the exact number of pages employed in the PSA is not critical. It's most important feature is its starting address which is desirably low or zero but which concomitantly means that it is an area of memory that is more likely to get "stepped on" by errant code.

The information generated in the present method is preserved by the operating system's program check interrupt handler. Early operating system recovery processing then filters the program check error information, identifying and externalizing (that is, transferring to logrec) any program check error that is the result of an address translation exception while trying to update storage. Depending on the scope of the implementation, the PSW key may also be used as a filtering criterion, allowing for distinction between code running in user PSW key, with a low likelihood of overlaying critical storage, versus code running in system key or key0, with a much higher likelihood of overlaying critical storage. One method to externalize these particular program check errors is by recording them to logrec with a special identifier designed to alert the logrec reviewer to a potentially dangerous condition on the system. Note that if such events are recorded to logrec, it is possible to further improve the alert process by taking advantage of abnormal end (ABEND) scoring tools. Such tools process error records in logrec and rank the severity of recorded errors based on various criteria including PSW key, modules involved, precedent, etc. This provides the ability to flag these alert records to both the customer and to Level 2 software support personnel.

In preferred embodiments of the present invention, the hardware identifies the following program check characteristics: address attempting to be translated and status (update versus reference). The hardware passes this information to software via the PSA's Fixed Low Core area. Before recording, the software determines whether this program check is resolvable or represents an error condition. Only if the software (specifically the program check interrupt handler) determines that the program check is not resolvable and thus an error condition, does it pass control to recovery which records the error to logrec. Any filtering on the PSW key from the CPU occurs during software recovery.

Figure 2:
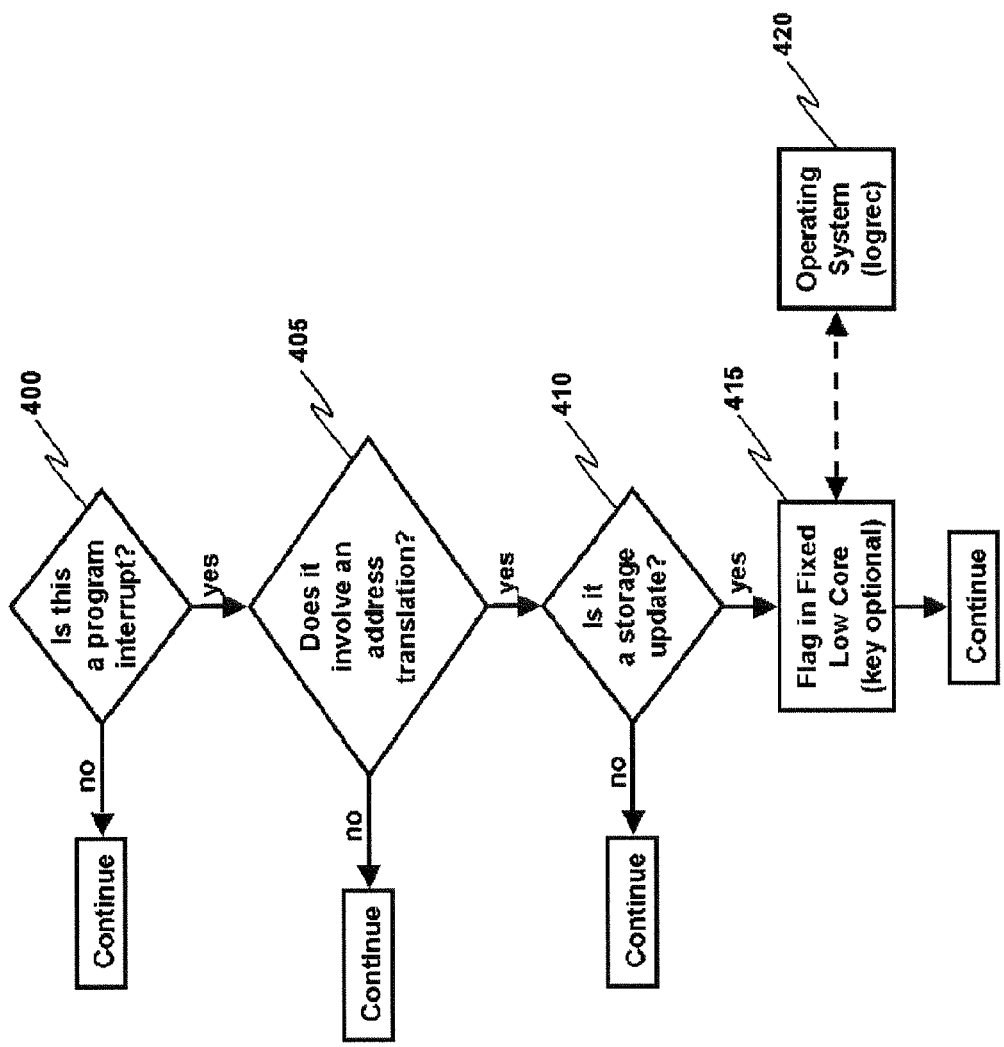
FIG. 2 is a flowchart illustrating process steps carried out in the practice of the method aspect of the present invention.

Attention is now focused upon the description of the present invention, as illustrated in FIG. 2. In the process of the present invention, it is first determined whether or not, a program interrupt has occurred (step 400). It is next determined whether or not this interrupt involves or occurs as a result of an address translation (step 405). It is then determined whether or not, the instruction involved calls for an update of storage (step 410). If it is determined that all three of these conditions are satisfied, then a flag is set in Fixed Low Core area 215 (step 415). Correspondingly, if it is determined that any of these conditions are not satisfied, processing continues normally. In its conventional system monitoring function, the operating system accesses this region of memory. During such access, the operating system detects (step 420) any flags set by the hardware relevant to the current of the three conditions set out above. In accordance with its normal functioning in the zSeries of machines, the operating system adds this information to its logrec file. Information with respect to the specific key value that was involved in this condition is also stored in area 215 so as to be communicated to software at the operating system level. In preferred embodiments of the present invention, this information is always stored as part of the PSW associated with the program interrupt. However, Operating System level software has the option of considering how it is to be used. It is also noted that the dashed double arrow, between steps 415 and 420, is meant to suggest a division between hardware functions on the left and a software function on the right.

However, it should be particularly noted that, while aspects of the present invention have been ascribed above to either a hardware function or to a software function, these are merely practical implementation differences. It is well known that many hardware functions, may be carried out using software; such processes are typified by emulation. Equally well-known is the fact that software functions may be carried out solely with the use of hardware; this is typically referred to as firmware. Descriptions of the present invention, as provided above, should therefore not be construed as necessarily having any given process step or functional operation carried out in either hardware or software. Also, no distinction should be ascribed to the terms "storage" and "memory" as they are used synonymously herein.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for identifying an operation in a data processing system that tend to produce addressing errors, said method comprising:

determining whether or not a program interrupt has occurred as a result of said operation;

if a program interrupt has occurred, then determining whether or not this interrupt involves an address translation;

if the interrupt does involve an address translation, then determining whether or not an instruction involved in the interrupt calls for an update of data processing system storage; and if the instruction does call for an update of storage, then setting an indication of such in an area of storage accessible to an operating system for said data processing system.

2. The method of claim 1 further including checking for said indication by operating system level software of said data processing system.

3. The method of claim 2 in which said operating system writes a record of said indication to an external file.

4. The method of claim 2 in which said operating system writes a record of said indication to an external file and said indication includes information pertaining to a key associated with said storage.

5. The method of claim 1 in which said indication includes information pertaining to a key associated with said storage.

6. The method of claim 5 in which said key refers to an area of storage which contains system control blocks.

7. The method of claim 5 in which said key has a binary value of zero.

8. The method of claim 1 which is carried out by a zSeries data processing system.

9. The method of claim 8 in which said area of storage is a region of storage having low addresses.

10. The method of claim 1 in which said area of storage is a storage block beginning with an address of zero.

11. A data processing system comprising:
a processor capable of responding to program check interrupts;
an addressable memory coupled to said processor;
an address translation unit for translating virtual addresses to a particular storage location in response to instruction execution in said processor; and
wherein said data processing system identifies an operation that tends to produce addressing errors by:
determining whether or not a program interrupt has occurred as a result of said operation;
if a program interrupt has occurred, then determining whether or not this interrupt involves an address translation;
if the interrupt does involve an address translation, then determining whether or not an instruction involved in the interrupt calls for an update of data processing system storage; and
if the instruction does call for an update of storage, then setting an indication of such in an area of storage accessible to an operating system for said data processing system.

12. The data processing system of claim 11 in which said setting of said indication is provided in an area of said memory accessible to an operating system for said data processing system.

13. The data processing system of claim 11 in which said area of memory has a low address.

14. The data processing system of claim 11 in which said area of memory has an address of zero.

15. The data processing system of claim 11 in which said indication includes information pertaining to a key, associated with a portion of said memory.

16. The data processing system of claim 15 in which said key refers to an area of memory which contains system control blocks.

17. The data processing system of claim 15 in which said key has a binary value of zero.

\* \* \* \* \*